Figure 1:
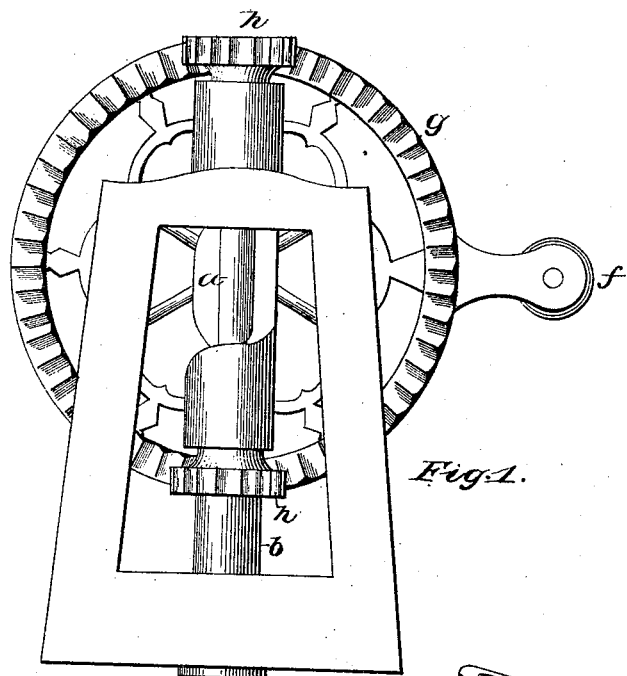
Figure 3:
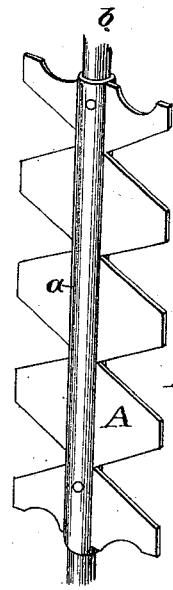
Figure 2:
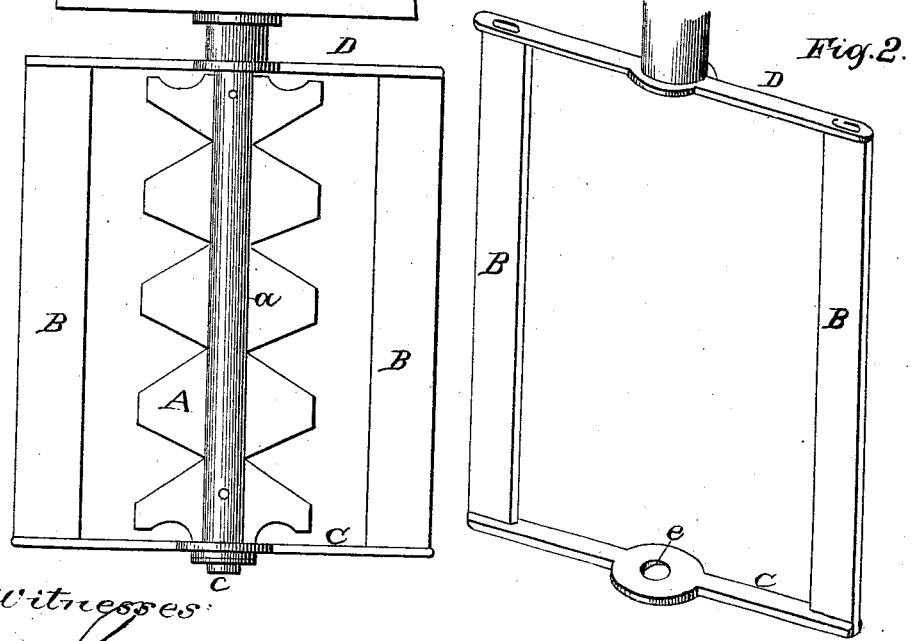

R. F. ROSS.

Churn.

No. 100,076.                    Patented Feb. 22, 1870.

Witnesses:

Inventor:

United States Patent Office.

RICE FARRAR ROSS, OF MARSHALL COUNTY, MISSISSIPPI.

Letters Patent No. 100,076, dated February 22, 1870.

IMPROVEMENT IN CHURNS.

The Schedule referred to in these Letters Patent and making part of the same.

*To all whom it may concern:*

Be it known that I, RICE FARRAR ROSS, of the county of Marshall, and State of Mississippi, have invented a new and useful Improvement in Churn-Dasher; and I do hereby declare that the following is a full and exact description thereof, reference being had to the accompanying drawings and to the letters of reference marked thereon.

The nature of my invention consists in so shaping the dashers, made of wood or metal, that, by the aid of the cog-wheels placed above the cover, they may be revolved rapidly in reverse directions at one and the same time, the inner dasher or paddle forcing the cream and air from the center of the churn to the sides of the churn, producing a vacuum, and the air and cream at the same time being rapidly agitated by the outer dasher revolving rapidly in the other direction.

What I claim as new and my invention, and of great advantage, is the mode of shaping and adjusting the dashers or paddles, they by this mode of gearing having a reverse motion, as shown and described in Figure I, which is a perspective view, showing dashers and cog-wheels in place, by the aid of which they are worked.

To enable others skilled in the art to make and use this my invention, I will proceed to describe its construction and operation.

Figure I is a perspective view of the dashers in place, also showing the gearing by the aid of which they are propelled in opposite directions at one and the same time.

Figure II displays the outer dashers or paddles B B, made of wood or metal, held in position at their upper and lower parts by a socket in upper and lower flanges, marked C and D, made of metal. To the flange D is attached a tube $b$, and worked by a small cog-wheel, marked $h$.

Figure III displays the shape and mode of adjusting the inner dasher, made of wood, marked A. This dasher is hollow, and through this dasher passes a rod, marked $a$, worked by the small wheel marked $d$; and at the bar that passes through plate C is a small screw and nut, marked $c$, holding the dashers A and B B together.

These dashers are propelled in opposite directions by the aid of large cog-wheel $g$, worked by handle $f$, and, by the arranging one small cog-wheel above and the other below, or at one-half the scribe of the circle, they are driven in opposite directions.

This dasher is intended to be used in the old tub-churn, dasher extending to the bottom of churn, and, by the nut $c$, can be taken apart to clean.

I claim as my invention—

The double serrated center-dasher A and external vertical-slotted dasher B B, in combination with the flanges or arms C D, the cog-wheels $g$ $h$, shafts $a$ and $b$, as described above and contained and specified.

RICE FARRAR ROSS.

Witnesses:
JAMES T. BOURNE,
C. A. W. SHERMAN.